(12) United States Patent
Raghunath et al.

(10) Patent No.: US 11,907,419 B2
(45) Date of Patent: Feb. 20, 2024

(54) INTELLIGENT USER INTERFACE ELEMENT SELECTION USING EYE-GAZE

(71) Applicant: Microsoft Technology Licensing, LLC, Redmond, WA (US)

(72) Inventors: Narasimhan Raghunath, Redmond, WA (US); Austin B. Hodges, Seattle, WA (US); Fei Su, Sammamish, WA (US); Akhilesh Kaza, Sammamish, WA (US); Peter John Ansell, Seattle, WA (US); Jonathan T. Campbell, Redmond, WA (US); Harish S. Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/362,156

(22) Filed: Jun. 29, 2021

(65) Prior Publication Data

US 2021/0325962 A1 Oct. 21, 2021

Related U.S. Application Data

(63) Continuation of application No. 15/840,098, filed on Dec. 13, 2017, now Pat. No. 11,073,904.

(Continued)

(51) Int. Cl.
*G06F 3/0481* (2022.01)
*G06F 3/0484* (2022.01)
(Continued)

(52) U.S. Cl.
CPC ............ *G06F 3/013* (2013.01); *G06F 3/0481* (2013.01); *G06F 3/04842* (2013.01); *G06F 3/04886* (2013.01); *G06F 40/274* (2020.01)

(58) Field of Classification Search
CPC .... G06F 3/013; G06F 3/0481; G06F 3/04842; G06F 3/04886; G06F 40/274
See application file for complete search history.

(56) References Cited

U.S. PATENT DOCUMENTS 5,912,721 A * 6/1999 Yamaguchi .......... G06V 40/193
351/209
6,005,549 A * 12/1999 Forest ..................... G06F 3/011
345/157

(Continued)

FOREIGN PATENT DOCUMENTS

| CN | 101515199 A | 8/2009 |
| CN | 104836900 A | 8/2015 |

(Continued)

OTHER PUBLICATIONS

"Office Action Issued in European Patent Application No. 18731332.5", dated Oct. 11, 2021, 6 Pages.

(Continued)

*Primary Examiner* — Jordany Nunez

(57) ABSTRACT

Systems and methods disclosed herein are related to an intelligent UI element selection system using eye-gaze technology. In some example aspects, a UI element selection zone may be determined. The selection zone may be defined as an area surrounding a boundary of the UI element. Gaze input may be received and the gaze input may be compared with the selection zone to determine an intent of the user. The gaze input may comprise one or more gaze locations. Each gaze location may be assigned a value according to its proximity to the UI element and/or its relation to the UI element's selection zone. Each UI element may be assigned a threshold. If the aggregated value of gaze input is equal to or greater than the threshold for the UI element, then the UI element may be selected.

20 Claims, 10 Drawing Sheets

Related U.S. Application Data

(60) Provisional application No. 62/537,434, filed on Jul. 26, 2017.

(51) Int. Cl.
*G06F 3/0488* (2022.01)
*G06F 3/01* (2006.01)
*G06F 3/04842* (2022.01)
*G06F 3/04886* (2022.01)
*G06F 40/274* (2020.01)

(56) References Cited

U.S. PATENT DOCUMENTS

| | | | | |
|---|---|---|---|---|
| 6,903,723 | B1* | 6/2005 | Forest | G06F 3/0483 345/157 |
| 8,484,573 | B1* | 7/2013 | Zhai | G06F 3/04886 345/173 |
| 8,775,975 | B2* | 7/2014 | Karmarkar | G06F 3/013 345/473 |
| 9,256,785 | B2* | 2/2016 | Qvarfordt | G06V 40/19 |
| 9,304,586 | B2* | 4/2016 | Nister | G06F 3/013 |
| 9,384,420 | B2* | 7/2016 | Qvarfordt | G06V 40/19 |
| 10,223,067 | B2* | 3/2019 | Morris | G10L 15/26 |
| 10,585,472 | B2* | 3/2020 | Tokubo | A63F 13/211 |
| 10,895,908 | B2* | 1/2021 | Nijs | G09G 5/373 |
| 11,042,259 | B2* | 6/2021 | Scott, II | G06F 3/04815 |
| 11,729,463 | B2* | 8/2023 | Schmidt | H04N 21/44218 725/10 |
| 2003/0142099 | A1* | 7/2003 | Deering | G09G 5/42 345/531 |
| 2011/0078613 | A1* | 3/2011 | Bangalore | G06F 3/04895 345/169 |
| 2011/0086674 | A1* | 4/2011 | Rider | G06F 3/04886 345/173 |
| 2011/0096010 | A1* | 4/2011 | Todoroki | G06F 3/04886 345/173 |
| 2012/0094700 | A1* | 4/2012 | Karmarkar | G06F 3/04842 455/466 |
| 2012/0105486 | A1* | 5/2012 | Lankford | G06F 3/005 348/78 |
| 2012/0203544 | A1* | 8/2012 | Kushler | G06F 40/30 704/9 |
| 2014/0002341 | A1* | 1/2014 | Nister | G06F 3/0237 345/156 |
| 2015/0113454 | A1* | 4/2015 | McLaughlin | G06F 3/013 715/765 |
| 2015/0177833 | A1* | 6/2015 | Vennstrom | G06T 7/73 345/156 |
| 2016/0132752 | A1* | 5/2016 | Qvarfordt | G06V 40/197 382/103 |
| 2016/0139665 | A1* | 5/2016 | Lopez | G06F 3/013 345/156 |
| 2016/0274660 | A1* | 9/2016 | Publicover | H04N 5/44504 |
| 2016/0364132 | A1* | 12/2016 | Stein | G06F 3/04886 |
| 2017/0045941 | A1* | 2/2017 | Tokubo | A63F 13/53 |
| 2017/0293402 | A1* | 10/2017 | Morris | G06F 3/0482 |
| 2017/0336865 | A1* | 11/2017 | Meyer | G06F 3/013 |
| 2018/0173417 | A1* | 6/2018 | Foresti | G06F 3/013 |
| 2018/0227630 | A1* | 8/2018 | Schmidt | H04N 21/4223 |
| 2020/0264701 | A1* | 8/2020 | Tokubo | A63F 13/32 |
| 2021/0048938 | A1* | 2/2021 | Scott, II | G06F 16/5866 |

FOREIGN PATENT DOCUMENTS

| | | |
|---|---|---|
| CN | 105190489 A | 12/2015 |
| CN | 105608469 A | 5/2016 |
| KR | 20120059304 A | 6/2012 |

OTHER PUBLICATIONS

"Office Action Issued in Indian Patent Application No. 202047000730", dated Mar. 9, 2022, 8 Pages.

"Notice of Allowance and Search Report Issued in Chinese Patent Application No. 201880048035.9", dated Sep. 15, 2021, 7 Pages.

* cited by examiner

INTELLIGENT USER INTERFACE ELEMENT SELECTION USING EYE-GAZE

CROSS-REFERENCE TO RELATED APPLICATIONS

This application is a continuation of U.S. patent application Ser. No. 15/840,098, filed Dec. 13, 2017, which application claims the benefit of U.S. Provisional Application Ser. No. 62/537,434, filed on Jul. 26, 2017, the entire disclosures of which are hereby incorporated herein by reference.

BACKGROUND

Eye gaze or eye tracking is a way of accessing an electronic device or communication aid using an input device (e.g., mouse) that is controlled by a user's eye or eyes. Eye-gaze interaction techniques may enable users to communicate and interact with electronic devices without the use of hands and fingers for typing. For example, users with certain motor disabilities may be able to communicate with eye-gaze technology. Currently, the primary technique used for gaze communication is eye-typing. To eye-type, a user looks at a letter on an on-screen (or virtual) keyboard. If the user's gaze remains fixed on the same letter for a set time period (the dwell-timeout), the system recognizes a user selection of that letter. Unfortunately, even the best eye-typing systems are relatively slow with reported entry rates ranging from 7-20 words per minute, with a plateau of roughly 23 words per minute. Such dwell-based eye-typing techniques may result in an unsatisfactory delay and/or user fatigue.

Furthermore, current eye-typing techniques often require the user to cleanly interact with a UI element in order to initiate an action upon the object. Cleanly interacting with a UI element may be defined as selecting the UI element within its visually defined boundaries (e.g., a rectangular or other-shaped outline of a key on a virtual keyboard). Selecting a graphic user interface element using a traditional input device may seem natural, i.e., a cursor may be placed over an object (e.g., using an input device such as a mouse or toggling via arrow keys on a keyboard) and the user may initiate an action on the object (e.g., mouse click or selection of enter key on a keyboard). However, interacting with UI elements using eye-gaze input may be difficult, as eye-gaze input is associated with a variety of processing challenges, such as eliminating noise-like eye jitter.

Eye-gaze jitter diminishes pointing accuracy for UI element selection based on current eye-gaze technology. For example, a user may desire to select a certain UI element, but because of eye-gaze jitter, a gaze location associated with the eye-gaze may be determined on or just outside of a border of the UI element. In this case, current systems would not recognize a user selection of the UI element because the user did not "cleanly" select the UI element. Moreover, current eye-gaze systems do not attempt to understand out-of-bounds and/or unclean gaze locations (e.g., gaze locations outside of the rectangular boundary of the UI element). Rather, current systems are limited to binary selections comprising: (1) recognizing a selection of a UI element if a gaze location is cleanly within the UI element's boundary; and (2) not recognizing a selection of a UI element if the gaze location is not within the UI element's boundary (no matter how close the gaze location is to the UI element boundary). This results in poor user experiences and prolonged periods of worktime, since certain gaze locations intending to select a UI element are ignored.

It is with respect to these and other general considerations that example aspects, systems, and methods have been described. Also, although relatively specific problems have been discussed, it should be understood that the examples should not be limited to solving the specific problems identified in the background.

SUMMARY

Implementations described and claimed herein address the foregoing problems by providing an intelligent user-interface element selection system using eye-gaze. In some example aspects, a series of logged gaze locations may be recorded by an eye-tracker system. The series of gaze locations may be aggregated and analyzed, and a determination may be rendered as to whether an action should be initiated upon a certain UI element or not. For example, some gaze locations received over a similar period of time may occur just outside the rectangular boundary of a certain UI element, and some gaze locations may occur just inside the rectangular boundary of the certain UI element. Taken together, the logged gaze locations just outside and just inside the UI element may cause the intelligent UI selection system to recognize a selection of that UI element.

In other example aspects, the intelligent UI selection system may present visual queues (e.g., visible selection boundaries) to the user for assistance in selecting the desired UI element. In other aspects, selection boundaries may be invisible to the user. The selection boundaries of the UI elements may be larger than the actual pre-defined boundaries of the UI elements. For example, the selection boundaries of some UI elements may overlap with the selection boundaries of other UI elements. In aspects, some UI elements may have selection boundaries that exceed the pre-defined boundaries of the UI elements, while other UI elements may have selection boundaries that match the pre-defined boundaries. The system may record a series of gaze locations to determine whether or not to initiate an action upon the UI element. For example, a series of gaze locations may comprise two gaze locations that fall within a selection boundary of the UI element but also fall within an area of overlap with a selection boundary of another UI element. However, the series of gaze locations may also comprise a gaze location that falls cleanly (e.g., exclusively) within the selection boundary of the UI element. As a result, the intelligent UI selection system may recognize a selection of the UI element and initiate an action corresponding to the UI element, even though some of the series of gaze locations did not fall cleanly within the selection boundary of the UI element. Whether the selection boundaries are invisible or visible may be pre-programmed or may be manually adjusted by the user.

In other example aspects, the intelligent UI selection system may assign certain point values (or weights) to certain locations around or within a UI element rather than using selection boundaries. For example, the system disclosed herein may utilize a dynamic scoring algorithm to determine whether or not to activate a certain UI element. In aspects, the center of a UI element may be assigned 10 points; the corners of the UI element may be assigned 5 points; and the area just outside a pre-defined boundary of the UI element may be assigned 3 points. In order for the system to recognize a selection and initiate an action corresponding to the UI element, a minimum threshold score of aggregated points may be set. The system may receive a series of gaze locations, identify a score (or point value) associated with each gaze location, and aggregate the scores (or point values) for the series of gaze locations. If the aggregated score exceeds the defined threshold score, then the UI element may be selected; and if the sum does not exceed the defined threshold score, then the UI element may not be selected. The scoring areas may comprise any shape around or within the UI element boundary, including but not limited to rings, squares, rectangles, ovals, or a combination of shapes.

In further example aspects, the scoring areas may be driven by predictive analysis and/or machine-learning algorithms that dynamically assign point values to certain areas within and around certain UI elements. For example, a user who selects the letter "Q" may find that the threshold score for the subsequent letter "u" is lower than the threshold score for the subsequent letter "z" because the predictive analysis and/or machine-learning algorithms may recognize that the letter "u" commonly follows the letter "q," but that the letter "z" does not commonly follow the letter "q." In further example aspects, the machine-learning algorithms may dynamically establish larger or smaller out-of-bounds areas based on a user's historical eye-gaze typing patterns. The out-of-bounds areas may comprise areas just outside the predefined boundary of a UI element. In aspects, an out-of-bounds area may refer to a buffer area extending along but outside of the predefined boundary of the UI element. In some example aspects, the system may create a larger out-of-bounds area for the backspace button for a user who may historically have trouble selecting the backspace button. Similarly, the system may create a smaller out-of-bounds area for the spacebar button for a user who historically locates and selects the spacebar button within its predefined boundaries. In further example aspects, the predictive analysis and/or machine-learning algorithms may be driven by statistical models, contextual information, historical eye-gaze typing patterns, third-party databases, and other information that may be relevant to determining whether a certain UI element should be acted upon or not.

A processor-implemented method for providing intelligent user interface element selection using eye-gaze is disclosed herein. In an aspect, a processor-implemented method for providing intelligent user interface element selection using eye-gaze is provided. The method includes determining at least one zone of a user interface, where the at least one zone comprises at least one UI element, and receiving gaze input, where the gaze input is associated with at least one gaze location within the user interface. The method further includes comparing the at least one gaze location to the at least one zone and, based on the comparison of the at least one gaze location to the at least one zone, assigning at least one value to the at least one gaze location. Additionally, the method includes comparing the at least one value with a threshold value associated with the at least one zone and, based on the comparison of the at least one value with the threshold value, determining at least one action response.

In another aspect, a computing device including at least one processing unit and at least one memory storing processor-executable instructions that, when executed by the at least one processing unit, cause the computing device to perform steps. The steps include determining at least one zone of a user interface, where the at least one zone comprises at least one UI element, and receiving gaze input, where the gaze input is associated with at least one gaze location within the user interface. The steps further include comparing the at least one gaze location to the at least one zone and, based on the comparison of the at least one gaze location to the at least one zone, assigning at least one value to the at least one gaze location. Additionally, the steps include comparing the at least one value with a threshold value associated with the at least one zone and, based on the comparison of the at least one value with the threshold value, performing at least one action response.

In yet another aspect, a processor-readable storage medium is provided. The processor-readable storage medium storing instructions for executing a method on one or more processors of a computing device, the method for providing intelligent user interface element selection using eye-gaze. The method includes determining at least one zone of a user interface, where the at least one zone comprises at least one UI element, and receiving gaze input, where the gaze input is associated with at least one gaze location within the user interface. The method further including comparing the at least one gaze location to the at least one zone and, based on the comparison of the at least one gaze location to the at least one zone, assigning at least one value to the at least one gaze location. Additionally, the method includes comparing the at least one value with a threshold value associated with the at least one zone and, based on the comparison of the at least one value with the threshold value, determining at least one action response. The method further includes providing the at least one action response on the user interface.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
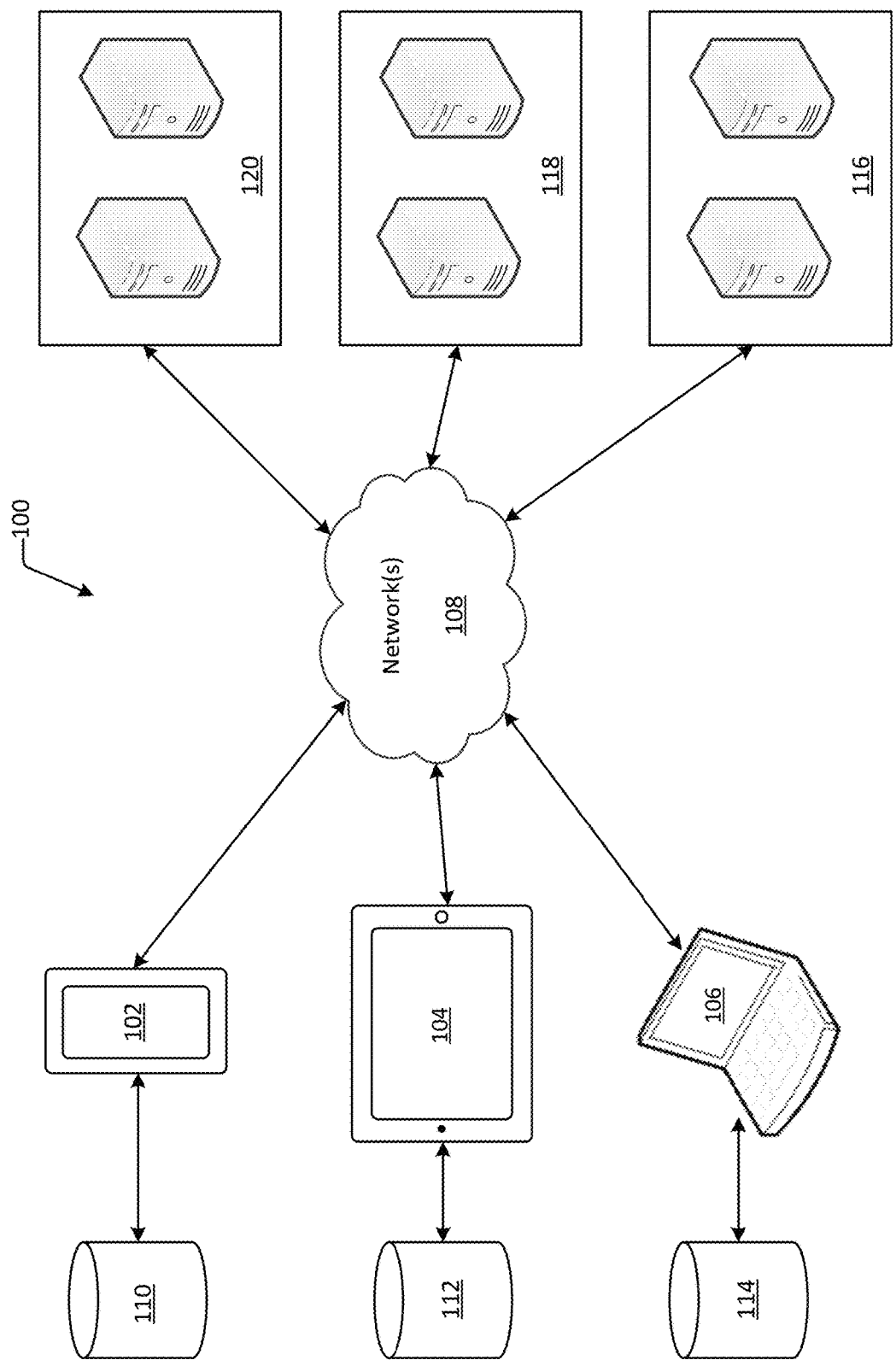
FIG. 1 illustrates an example of a distributed system for implementing intelligent UI element selection using eye-gaze.

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Implementations described and claimed herein describe example aspects of an intelligent UI element selection system using eye-gaze. Current eye-gaze technology forces the user to gaze within the designated rectangular area of the UI element in order to select that UI element. Such a requirement does not account for eye-jitter and human error. For example, a user may intend to select a certain UI element, but the gaze location (pixel coordinate) may be just outside the UI element's boundary. Because the gaze location is not directly within the boundary, the gaze location data point has no effect on selecting the UI element, even though the location data point may be very near the boundary of the desired UI element. To overcome this deficiency, the intelligent UI element selection system disclosed herein provides for automatically configuring or adjusted selection regions or boundaries. Selection regions may be applied to a set of UI elements and selection boundaries may be applied to individual UI elements. The size of the selection regions or boundaries may be larger or smaller according to predictive analysis and machine-learning algorithms that intelligently predict the user's next move. For example, when a user is interfacing with an electronic mail application using a virtual keyboard to type a response, the intelligent UI element selection system may dynamically adjust the selection regions of the individual character keys on the virtual keyboard. For example, if a user is eye-typing a word that starts with "q," then the selection region for the letter "u" may be enlarged, since that letter is statistically more likely to follow the letter "q" than other letters. Conversely, the selection region for the letter "z" may be minimized, since that letter is statistically less likely to follow the letter "q."

In other example aspects, the intelligent UI element selection system may be applied to scenarios not involving text input and virtual keyboards. For example, when a user is interfacing with a webpage or third-party application, certain UI elements may be statistically clicked more than other UI elements. As such, the most frequently clicked UI elements may have a larger selection region than the UI elements that are not usually clicked. Such information may be derived from the selection zone processor, which may be configured to communicate with local and remote databases storing statistical models and housing user-specific and community-wide click-log data.

The intelligent UI element selection system disclosed herein may be implemented with an eye tracker hardware device that is able to record a plurality of gaze location points within milliseconds. Current eye-gaze typing solutions do not account for out-of-bounds gaze locations that are just outside the boundaries of UI element buttons or keys. As a result, users spend prolonged amounts of time staring at a screen and actively adjusting their gaze location to select UI elements. This may result in user fatigue and injury, as well as a frustrating user experience. The present disclosure describes intelligently selecting a UI element using eye-gaze by accounting for gaze location errors.

FIG. 1 illustrates an example of a distributed system implementing intelligent UI element selection using eye-gaze.

A system implementing intelligent UI element selection using eye-gaze may be executed on electronic devices including but not limited to client devices such as mobile phone 102, tablet 104, and personal computer 106. The disclosed system may receive eye-gaze input data and UI layout data while running an application including but not limited to a text messaging application, an electronic mail application, a search engine application, a word processing application, or any other application accepting text input or UI element selection, such as a web browser application. The disclosed system may then process the eye-gaze input locally, remotely, or using a combination of both. During processing, the disclosed system may rely on local and/or remote databases to generate a selection zone or boundary for association with one or more UI elements of the subject application or website. This may be accomplished by utilizing local data (e.g., local datasets 110, 112, 114) stored in a local database associated with client devices 102, 104, 106, and/or remote databases stored on or associated with servers 116, 118, 120, or a combination of both.

For example, mobile phone 102 may utilize local dataset 110 and access servers 116, 118 and/or 120 via network(s) 108 to process the eye-gaze input data and generate an appropriate selection zone or boundary. In other example aspects, tablet 104 may utilize local database 112 and network(s) 108 to synchronize the relevant tokens and features extracted from the processed eye-gaze input data and the generated selection zone or boundary across client devices and across all servers running the intelligent UI element selection system. For example, if the initial eye-gaze input is received on tablet 104, the eye-gaze input data and subsequent predicted word or action response may be saved locally in database 112, but also shared with client devices 102, 106 and/or servers 116, 118, 120 via the network(s) 108.

In other example aspects, the intelligent UI element selection system may be deployed locally. For instance, if the system servers 116, 118, and 120 are unavailable (e.g., due to network 108 being unavailable or otherwise), the intelligent UI element selection system may still operate on a client device, such as mobile device 102, tablet 104, and/or computer 106. In this case, a subset of the trained dataset applicable to the client device type (e.g., mobile device, tablet, laptop, personal computer, etc.) and at least a client version of the machine-learning algorithms may be locally cached so as to automatically respond to relevant tokens and features extracted from eye-gaze input data and UI layout data on the client device. The system server 116, 118, and 120 may be unavailable by user selection (e.g., intentional offline usage) or for a variety of other reasons, including but not limited to power outages, network failures, operating system failures, program failures, misconfigurations, hardware deterioration, and the like.

As should be appreciated, the various methods, devices, components, etc., described with respect to FIG. 1 are not intended to limit system 100 to being performed by the particular components described. Accordingly, additional topology configurations may be used to practice the methods and systems herein and/or components described may be excluded without departing from the methods and systems disclosed herein.

Figure 2:
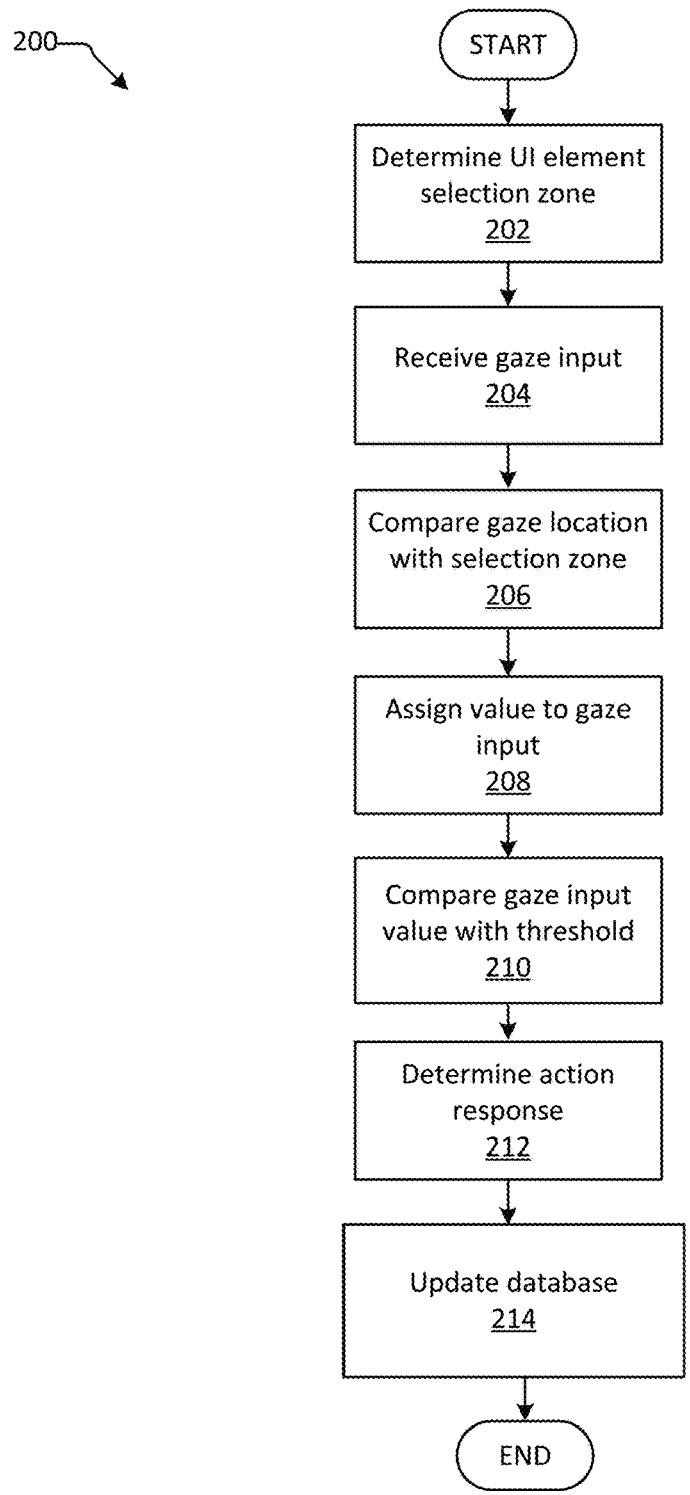
FIG. 2 is a block diagram illustrating a method for intelligent UI element selection using eye-gaze.

FIG. 2 is a block diagram illustrating a method for intelligent UI element selection using eye-gaze.

Figure 4A:
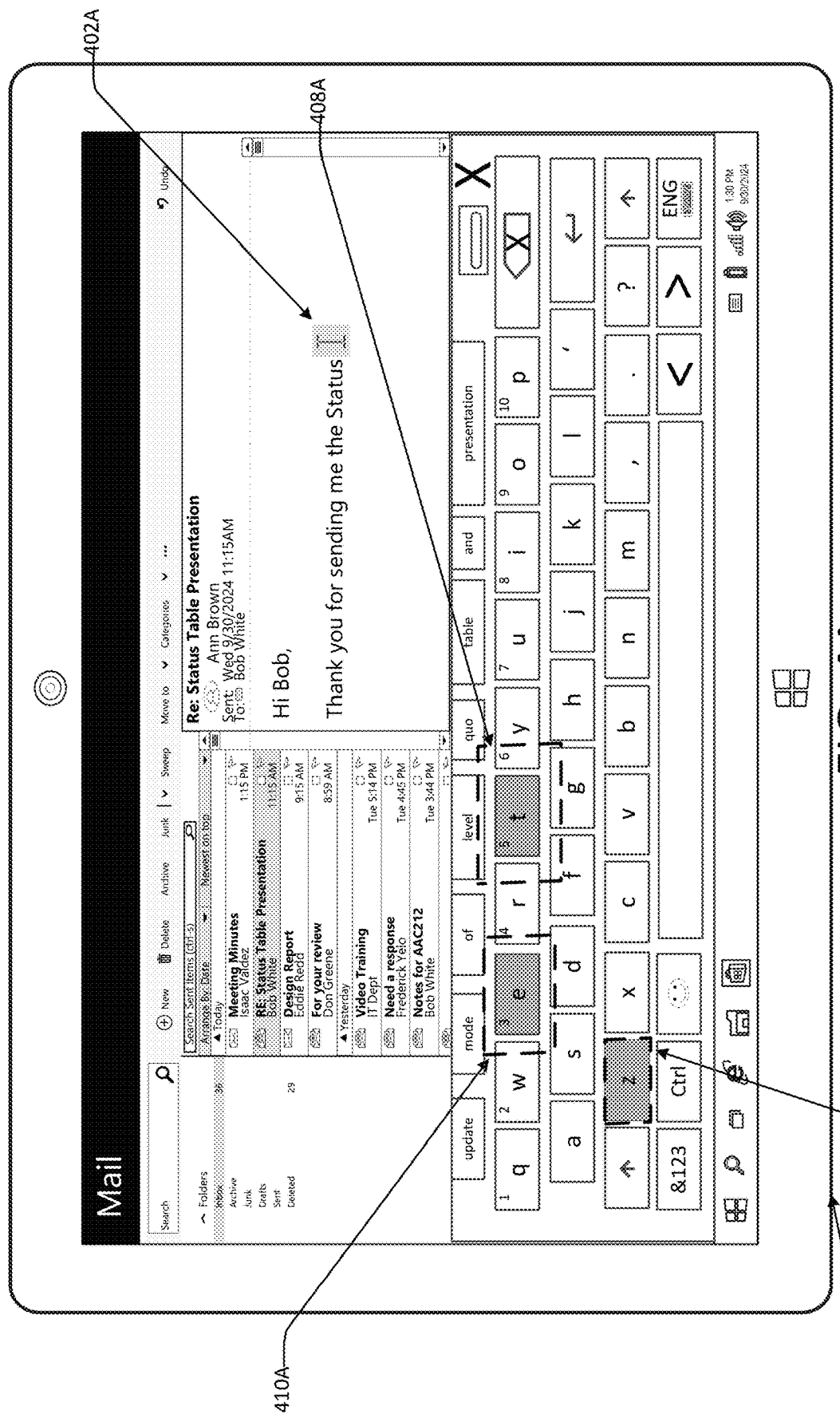
FIG. 4A illustrates an example of intelligent UI element selection using eye-gaze according to selection zone size.

Method 200 may begin with determine UI element zone operation 202. Method 200 may receive UI layout data prior to receiving eye-gaze input data. The UI layout data from the screen may indicate the type of UI elements presently on the screen, their locations, their importance (e.g., the consequences of activating the button), and other relevant data associated with the UI elements. According to this UI layout data, each UI element displayed on the screen may be assigned a certain UI element selection zone (or boundary) at operation 202. In some example aspects, the UI element selection zone may take the form of a selection boundary. A selection boundary may be a boundary that is slightly larger than the actual boundary of the UI element key. The selection boundary may correspond to the shape of the UI element, e.g., a rectangular-shaped UI element may be associated with a rectangular-shaped selection boundary. The selection boundaries for various character keys are depicted in FIG. 4A by dashed lines. A gaze location that lands within the selection boundary, even though it might be just outside the actual boundary of the UI element, may still activate the UI element. In this way, dynamic configuration of selection boundaries for various UI elements may take into consideration that gaze locations just outside of the actual boundaries of UI elements may still indicate the user's intention to select or activate the UI element.

Figure 4B:
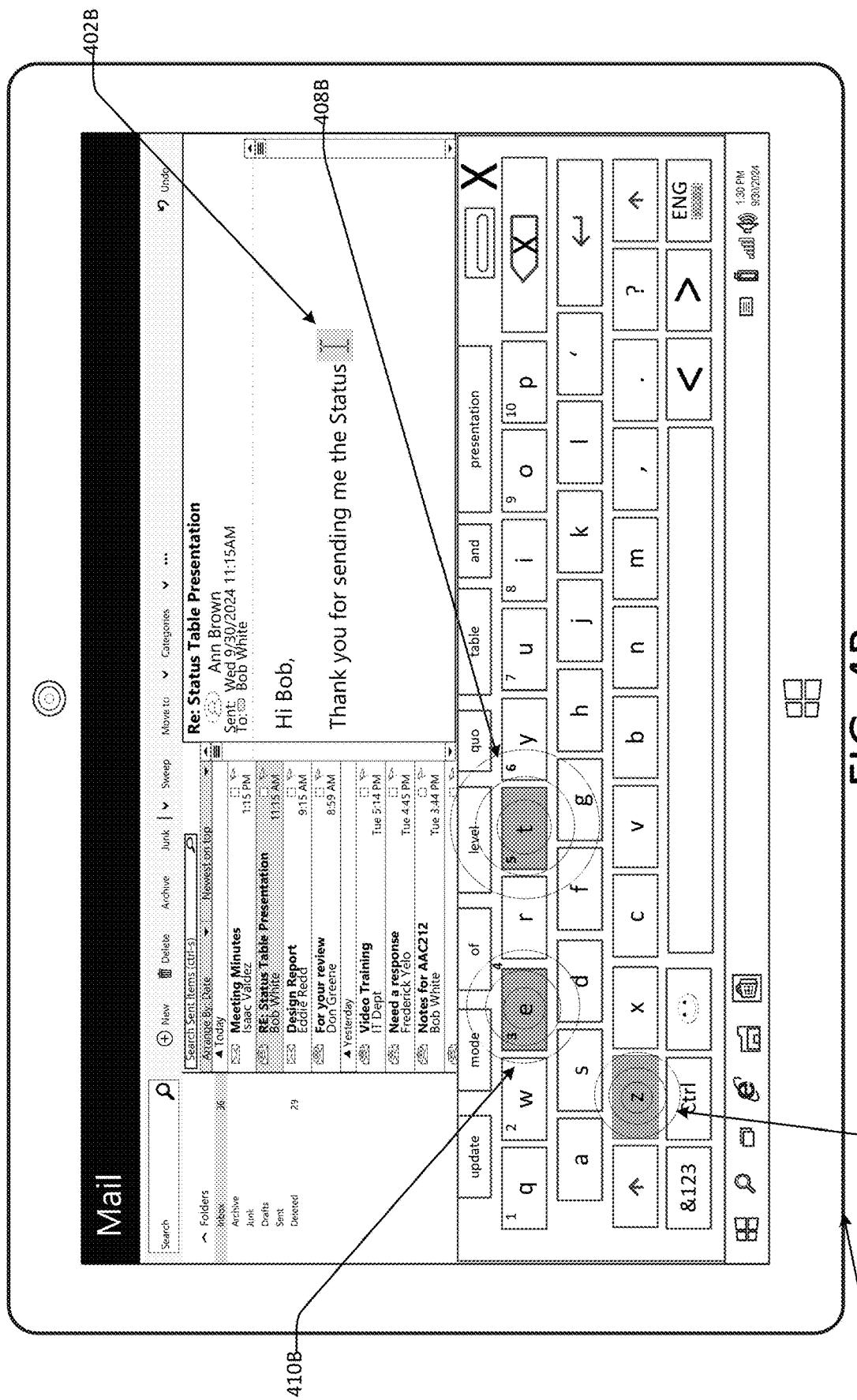
FIG. 4B illustrates an example of intelligent UI element selection using eye-gaze according to a segmented scoring areas.

In other example aspects, the UI element selection zones may take the form of segment scores. For example, each UI element may be associated with concentric rings overlaid on top of the UI element. Each area within the concentric rings may denote a certain score. An aggregate of the gaze locations in and around the concentric rings may be analyzed by the intelligent UI element selection system. A threshold score may be assigned to each UI element, which may be different for different UI elements. Each concentric ring may be assigned a certain sub-score. If the sum of the gaze location scores (e.g., gaze locations landing within the areas of the concentric rings) exceeds the threshold score for that UI element, then the UI element may be selected. The segment score implementation of UI element selection zones is depicted in FIG. 4B.

After each UI element selection zone is determined in operation 202, the UI element selection system may receive gaze input at operation 204. Gaze input may comprise a series of gaze locations (e.g., pixel coordinates) collected by an eye-tracker and mapped to the user interface.

Method 200 may then use the gaze input received in operation 204 and the UI element selection zone determinations of operation 202 and compare the two sets of data at operation 206. The gaze input may be compared with the UI element selection zones. Method 200 may consider the proximity of the gaze locations to the selection zones of certain UI elements to determine the intent of a user. The operation 206 may also involve referencing the selection zone processor. The gaze input of operation 204 may indicate that the user desired to enter a certain word or select a certain webpage button. As such, the UI element selection zones may eventually be adjusted as feedback based on the user's behavior.

At operation 208, a value may be assigned to the gaze input. If the gaze input was within the UI element boundary, then the value may receive a higher number of points as compared to a gaze input that was recorded just outside the UI element boundary, but still within the selection zone. In some example aspects, the values assigned to the gaze input may not be based on points but rather another weighted-importance measurement. For example, when a user is navigating a webpage, a certain UI element that is frequently clicked by the user (according to historically stored click-log data by the user) may have a lower threshold weight than another UI element that is less frequently clicked. A lower threshold weight may indicate that a gaze location that is near the UI element may activate that UI element, whereas a higher threshold weight may indicate that the gaze location must to be within the UI element boundary to activate the UI element. Alternatively, for a higher threshold weight, a plurality of gaze locations must be recorded in and around the boundary of the UI element to activate the UI element.

UI elements that are statistically most likely to be selected may be assigned a lower threshold value, so that a fewer number of accurate gaze locations are required to activate the UI element. Conversely, UI elements that are statistically less likely to be selected by the user may be assigned higher threshold values, so that more accurate gaze locations are required to activate the UI element.

At operation 210, the gaze input value may be compared with a threshold for the UI element. In the example aspect of using expanded selection zones outside of the UI element boundary (e.g., FIG. 4A), the threshold associated with the UI element may be satisfied by any gaze location that lands within the selection zone, regardless if it is within the UI element boundary or not. In other example aspects that use segmented scores, the UI element threshold may be a numerical value. For example, the threshold for a certain UI element may be "20," where the center of a concentric circle associated with the UI element is worth 5 points, the middle circle is worth 3 points, and the outer circle is worth 1 point. In such a scenario, if four gaze locations are recorded within the center circle of the concentric circles (that is, 4 times 5 points equaling 20 points), the UI element may be activated. Similarly, if twenty gaze locations are recorded within the outer circle (that is, 20 times 1 point equaling 20), the UI element may be activated. Furthermore, a combination of gaze location data points in the center concentric circle, the middle concentric circle, and the outer concentric circle may activate the UI element.

At operation 212, an action response may be determined by method 200. The action response may consist of selecting the UI element or not selecting the UI element. For example, if the aggregated gaze input value is equal to or greater than the UI element threshold, the UI element may be selected. In such a scenario, the scores associated with the gaze locations received for that UI element may be discarded (e.g., the bucket of scores is dumped). In other example aspects, the scores associated with gaze locations may not equal or exceed the threshold for the UI element. In such a scenario, the UI element is not selected. Furthermore, if a gaze input is not logged for a certain duration of time within the selection zone of the UI element, then the UI element may automatically discard the insufficient scores to prevent the user from inadvertently activating the UI element with an out-of-context glance.

At operation 214, at least one database may be updated with the eye-gaze input, the UI layout data, the selection zone determinations and/or adjustments, the determined action response and any user's response to the determined action response, among other pertinent data. A user response to the determined action response may be a rejection or a confirmation. For example, if the user initiates a rejection of a UI element that was selected (e.g., by initiating a backspace UI element), the system may update the database with an indication that selection of the UI element was incorrect and may adjust an associated selection zone and/or threshold for the UI element accordingly. Alternatively, if the user initiates a confirmation of a UI element that was selected (e.g., by continuing to initiate selection of the next UI element), the system may update the database with an indication that selection of the UI element was correct and may confirm an associated selection zone and/or threshold for the UI element. In addition to updating a database with the above data at operation 214, and the data may be shared with predictive analysis and machine-learning algorithms that power the selection zone processor described in FIG. 3. The data that is stored may be referenced in the future to intelligently determine whether a certain UI element selection zone should be enlarged or minimized, for example.

As should be appreciated, the various methods, devices, components, etc., described with respect to FIG. 2 are not intended to limit method 200 to steps being performed in the same order by the particular components described. Accordingly, additional topology configurations may be used to practice the methods and systems herein and/or components described may be excluded without departing from the methods and systems disclosed herein.

Figure 3:
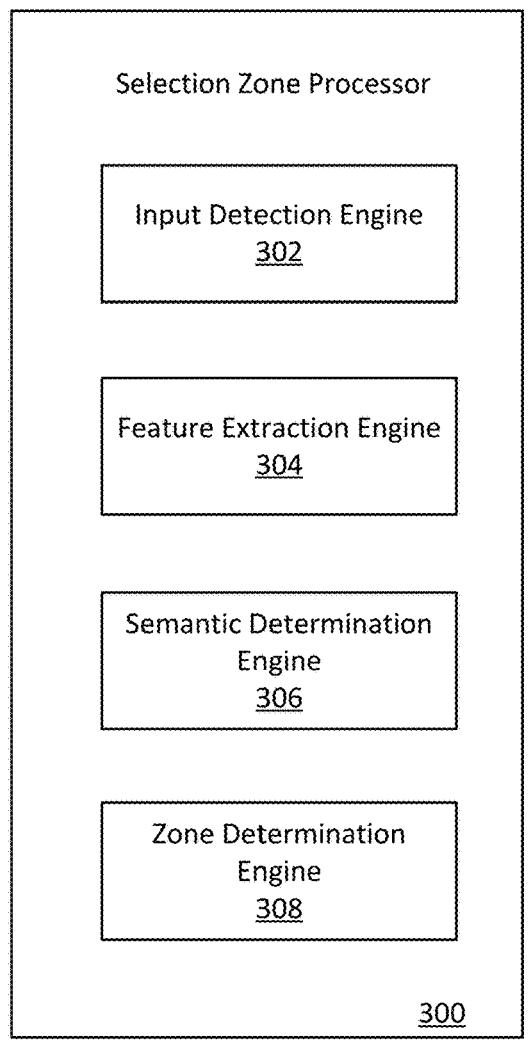
FIG. 3 is a block diagram illustrating a selection zone processor.

FIG. 3 is a block diagram illustrating a selection zone processor.

Selection zone processor 300 may be configured to receive eye-gaze input data, UI layout data, preconfigured UI element selection zones, and other relevant data for dynamically determining the selection zones of UI elements. Selection zone processor may have an input detection engine 302 that receives the eye-gaze input data, UI layout data, and other information related to UI element selection zones. The input detection engine 302 may record the gaze locations (pixel coordinates) and may also record the proximity of those gaze locations to various UI elements on the user interface.

The input detection engine 302 may then send the data from the eye-gaze input and UI layout to the feature extraction engine 304. The feature extraction engine 304 may be configured to communicate with local and remote databases that store, among other relevant information, lexical features and contextual features. The lexical features that the feature extraction engine 304 may involve referencing dictionaries of word n-grams. For example, if a user is using a word processing application or an application that involves text entry, the UI elements that are considered by the selection zone processor may consist of character keys. If a user eye-types the letter "q," then the feature extraction engine 304 may reference a lexical dictionary of word n-grams and statistical models that prompt the system to enlarge the selection zone for the UI element corresponding to character "u" because that letter is statistically most likely to follow the letter "q." Similarly, a selection zone for a UI element corresponding to a consonant, such as the character "z," may be minimized to the UI element boundary, or even minimized below the UI element boundary, forcing the user to fixate on the center of that UI element to indicate a clear intention to select it, in order to avoid inadvertent errors.

In some example aspects, feature extraction engine 304 may be used in scenarios not involving a virtual keyboard. For example, an eye-gaze input on a webpage may indicate that the user is intending to select a button at the bottom of a page. The feature extraction engine 304 may retrieve historical user data (e.g., from local and/or remote databases) related specifically to the current webpage (e.g., based on the particular user or crowd-sourced data for the webpage), may analyze past user actions on the webpage (e.g., buttons that were selected in the past at the bottom of this webpage), and may determine selection zones for the UI elements at the bottom of the webpage.

Once the features of the eye-gaze input and the UI layout data are extracted by feature extraction engine 304, the feature data may be sent to the semantic determination engine 306. The semantic determination engine 306 may be configured to receive all of the previous processing data of the eye-gaze input and the UI layout data, as well as communicate with local and/or remote databases that may include statistical models. Semantic determination engine 306 may determine the intended meaning of the user's actions. In the example of a virtual keyboard, the semantic determination engine 306 may consider a set of possible suggested words that may be intended by the user, based on the gaze locations and associated character keys. The set of suggested words can be utilized by the zone determination engine 308 to dynamically assign certain selection zones to certain character keys, as described further below.

Not only may semantic determination engine 306 consider words and characters, but semantic determination engine 306 may also consider user actions on webpages and within applications that do not directly involve a virtual keyboard for deriving context for various UI elements. The semantic determination engine 306 may evaluate contextual information (e.g., user is playing a game and gazing at the in-game controls) and statistical models (e.g., personal- or crowd-based gaze locations within this game application statistically correspond to specific controls) for various UI elements.

In other example aspects, in identifying semantics associated with various UI elements, the semantic determination engine 306 may be configured to consider the type of application in use (e.g., email application versus word processing application), the previous message context of a message thread, the substantive content within a document in a word processing application, the GPS location of the user, the intended recipient of a message, and any other pertinent data. The semantic determination engine 306 may assess all of this data and determine a semantic meaning of a subsequent predicted word, and/or the intended action of the user according to the user's gaze path. The semantic determination engine 306 may determine a semantic meaning associated with a UI layout data and a corresponding eye-gaze path. The semantic meaning may then be used to dynamically assign selection zones to UI elements within the user interface, as described further below.

Based on a semantic meaning assigned to the eye-gaze input data and the UI layout data, or any other pertinent data, the zone determination engine 308 may apply new UI element selection zones to various UI elements. The UI elements may consist of individual character keys on a virtual keyboard, or the UI elements may consist of action buttons within a webpage or application interface. The selection zones may be in the form of a single region zone encompassing a boundary of a UI element, or the selection zones may be in the form segmented scoring areas (e.g., concentric circles) encompassing a boundary of the UI element. In other example aspects, the selection zones may be configured according to a weight of the UI element itself, meaning that certain UI elements may command more importance than others according to the function of the UI element and historical data associated with interaction of that UI element.

As should be appreciated, the various methods, devices, components, etc., described with respect to FIG. 3 are not intended to limit selection zone processor 300 to being performed by the particular components described. Accordingly, additional topology configurations may be used to practice the methods and systems herein and/or components described may be excluded without departing from the methods and systems disclosed herein.

FIG. 4A illustrates an example of intelligent UI element selection using eye-gaze based on selection zone size for UI elements.

Device 400 may be running an electronic mail application. As illustrated, the user may be replying to an email message and about to enter the next character and/or word at cursor location 402A. Prior to entering the next character and/or word, the intelligent UI element selection system disclosed herein may predict that the next word that the user intends to input is "table," since the previous word is "Status" with a capital "S," and the re: line of the email is "Status Table Presentation." Furthermore, an associated email chain may indicate that the status table presentation was previously sent to the user, and the user is now thanking the sender for the status table presentation. Such contextual cues and information may be analyzed and considered by the selection zone processor 300 (FIG. 3) to determine the appropriate UI element selection zones. In this scenario, the UI selection zone 408A is comparably larger than the UI selection zone 412A, since zone 408A is associated with the letter "t" and zone 412A is associated with the letter "z." As detailed above, the predictive analysis and machine-learning algorithms that are used by the selection zone processor may determine that the next word intended by the user is "table." As such, the UI element selection zone may be larger for the letter "t" than for the letter "z." Similarly, the UI selection zone 410A corresponding to letter "e" may be slightly smaller than selection zone 408A corresponding to letter "t," but may still be larger than selection zone 412A corresponding to letter "z." In some example aspects, the intelligent UI element selection system may integrate with other predictive typing technologies. Here, the user may have the ability to intelligently type using eye-gaze by gazing at the first and last letter of the desired word. The desired word in this example aspect is "table." As a result, the UI element selection zones 408A and 410A may be enlarged as compared to other UI elements available on the screen.

In some example aspects, the UI element selection zones may be communicated to a user using a visual cue, such as by highlighting, dashed lines (as shown), or otherwise. In other example aspects, the UI element selection zones may not be visible to the user.

FIG. 4B illustrates an example of intelligent UI element selection using eye-gaze based on segmented scoring areas for UI elements.

Instead of using selection zone size as depicted in FIG. 4A, the UI element selection system may be implemented with segmenting scoring areas for UI elements. Segmented scoring areas may be depicted by different point tiers, such as concentric scoring circles. The center of the concentric circle may be worth the most points, while the outer concentric circle may be worth the least points. Each concentric circle may be overlaid on or around a boundary of a UI element. Each UI element may possess a threshold score. The UI element selection system may analyze a series of gaze locations within the concentric circles around a UI element to determine if the sum of the gaze location scores is equal to or greater than the UI element threshold score. For example, if the UI element corresponding to character "t" possessed a threshold score of 20 points, and the overlaid concentric circles 408B had point values of 5 points (central circle), 3 points (middle circle), and 1 point (outer circle), then a user may need to log four center gaze locations to activate/select the character "t." Similarly, a user could log twenty gaze locations in the outer concentric circle to select the character "t." In this example aspect, the character "z" may have a smaller concentric circle 412B, forcing the user to fixate more accurately on that character in order to select it. In other example embodiments, the character "z" may have a higher threshold score than 20 points in conjunction with the smaller concentric scoring circles.

In further example aspects, the segmented scoring areas may not be in the shape of circles, but may assume the form of any shape. Furthermore, the segmented scoring implementation may use any number of scoring areas. The example aspects are not limited to just three concentric circles.

The UI element selection system disclosed herein is not limited to text input and virtual keyboard scenarios. The UI elements selection system may be applied to webpage activity and interaction with any application user interface. For example, a UI element on a webpage that is in the form of a hyperlink may receive a lower threshold value (e.g., lesser weight) than a UI element that illustrates a text block. The lower threshold value or lesser weight of a UI element allows that UI element to be selected more quickly than UI elements that have higher threshold values and higher weights. In other example aspects, critical keys, such as the "close program" key, may have higher weights than other UI elements due to the significant consequences of selecting such a critical key.

As should be appreciated, the various methods, devices, components, etc., described with respect to FIGS. 4A and 4B are not intended to limit device 400 and the described features to being performed by the particular components described. Accordingly, additional topology configurations may be used to practice the methods and systems herein and/or components described may be excluded without departing from the methods and systems disclosed herein.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, as described herein.

Figure 5:
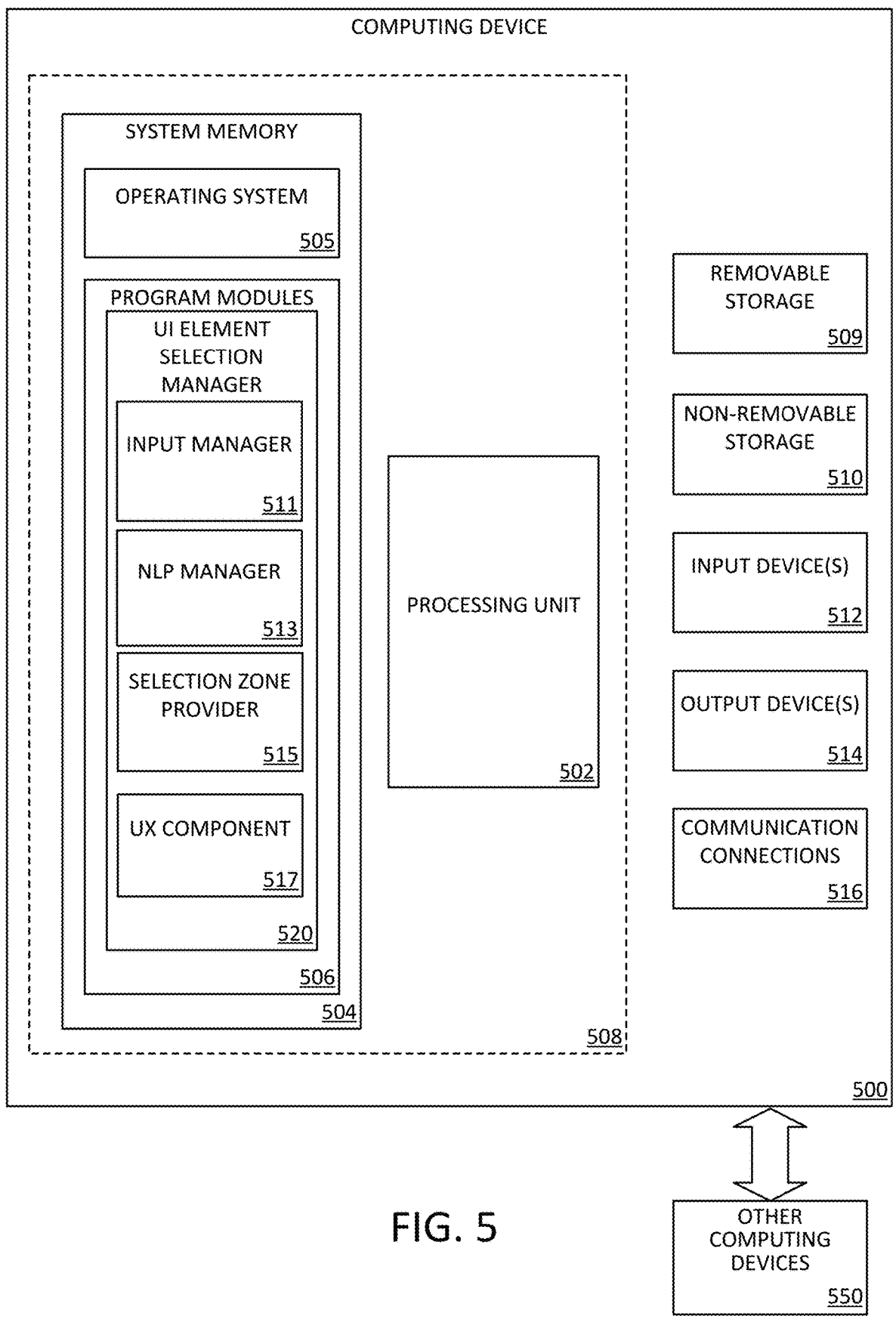
FIG. 5 is a block diagram illustrating example physical components of a computing device with which aspects of the disclosure may be practiced.

FIG. 5 is a block diagram illustrating example physical components (e.g., hardware) of a computing device 500 with which aspects of the disclosure may be practiced. The computing device components described below may have computer-executable instructions for implementing a UI element selection manager 520 on a computing device (e.g., server computing device and/or client computing device). The computer-executable instructions for a UI element selection manager 520 can be executed to implement the methods disclosed herein, including a method of dynamically adjusting UI element selection zones according to a selection zone processor. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running a UI element selection manager 520, such as one or more components with regard to FIGS. 1, 2, 3, 4A, and 4B, and, in particular, a input manager 511, a Natural Language Processor (NLP) manager 513, a selection zone provider 515, and/or UX Component 517.

The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., UI element selection manager 520) may perform processes including but not limited to the aspects, as described herein. Other program modules that may be used in accordance with aspects of the present disclosure, and in particular for dynamically adjusting UI element selection zones according to a selection zone processor, may include an input manager 511, an NLP manager 513, a selection zone provider 515, and/or UX Component 517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such tangible computer storage media may be part of the computing device 500. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
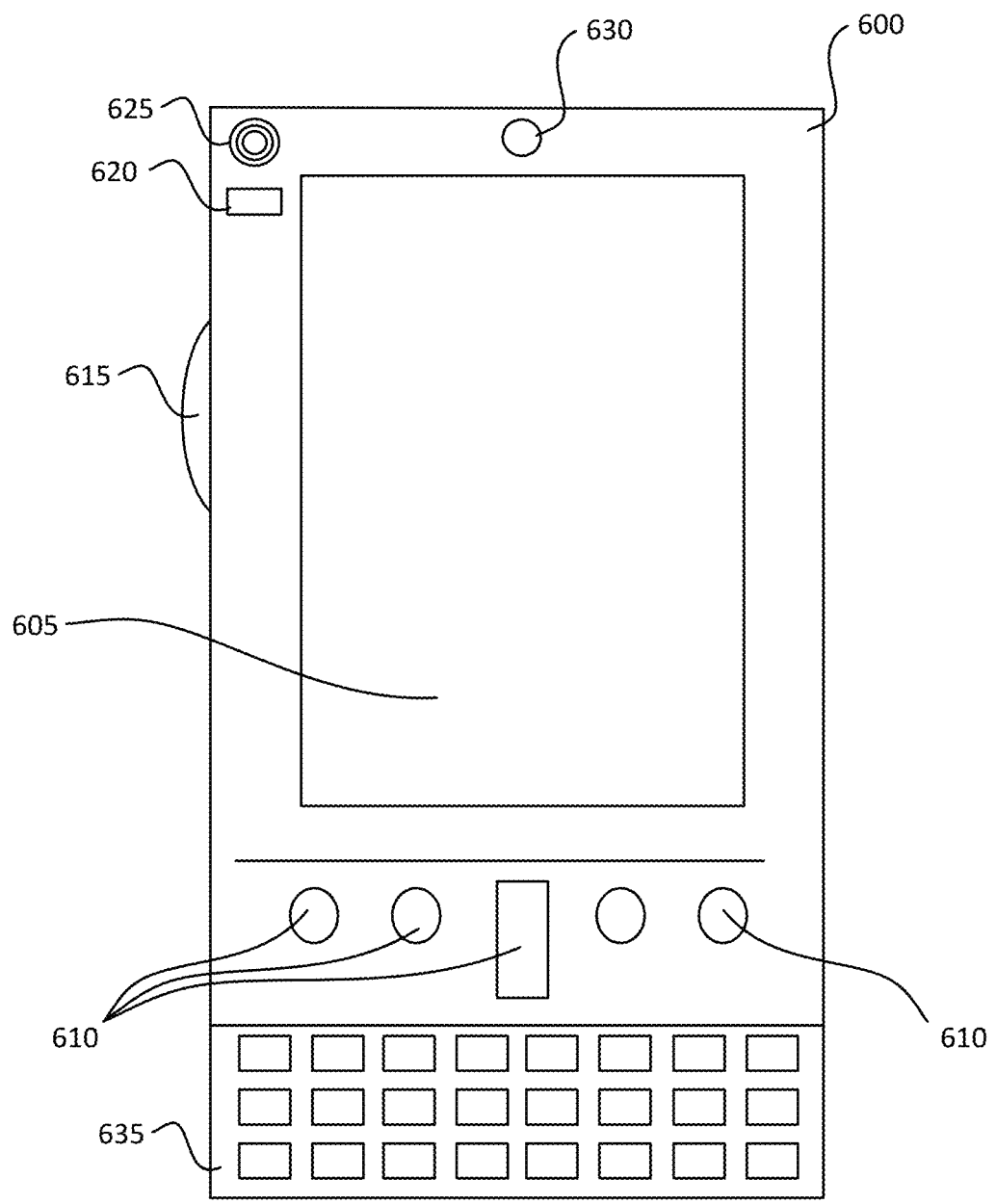
FIGS. 6A and 6B are simplified block diagrams of a mobile computing system in which aspects of the present disclosure may be practiced.
Figure 6B:
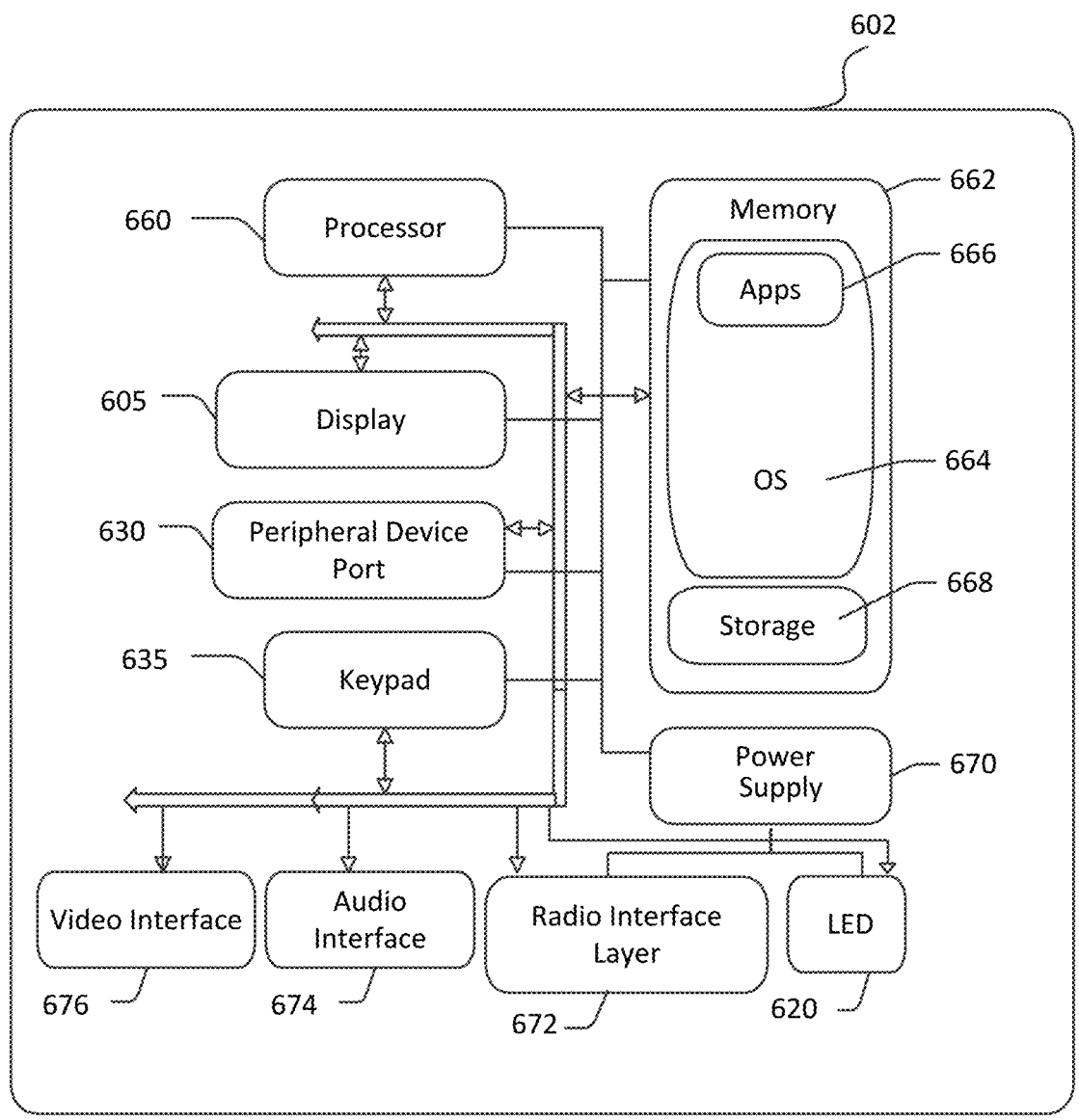

FIGS. 6A and 6B illustrate a mobile computing device 600, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for dynamically adjusting UI element selection zones according to a selection zone processor as described herein (e.g., input manager 511, NLP manager 513, selection zone provider 515, and/or UX Component 517, etc.).

The system 602 has a power supply 670, which may be implemented as one or more batteries. The power supply 670 may further include an external power source, such as an AC adapter or a powered docking cradle that supplements or recharges the batteries. The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 625 (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and are not intended to limit the disclosure to a particular sequence of steps or a particular combination of hardware or software components.

Figure 7:
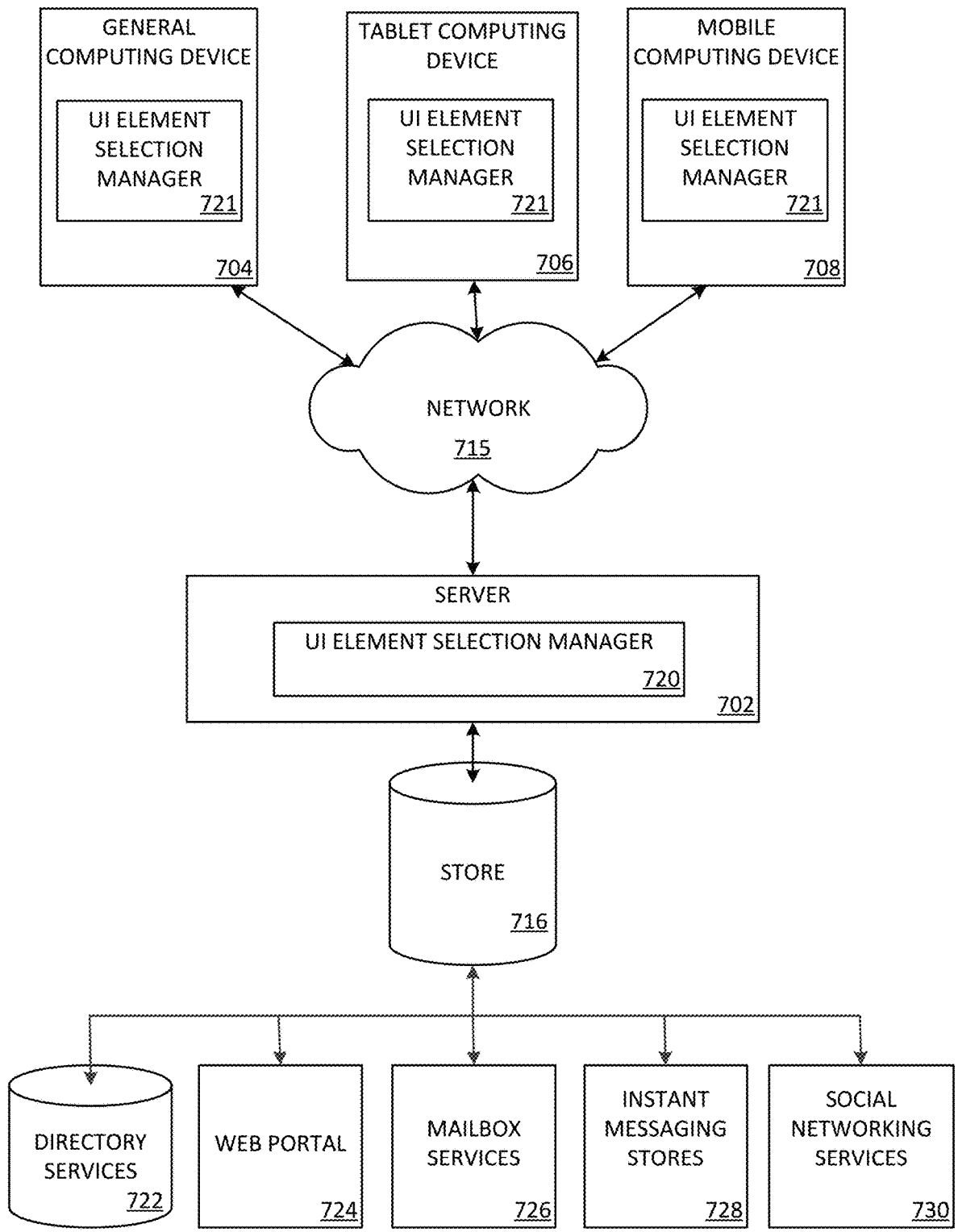
FIG. 7 is a simplified block diagram of a distributed computing system in which aspects of the present disclosure may be practiced.

FIG. 7 illustrates one aspect of the architecture of a system for processing data received at a computing system from a remote source, such as a general computing device 704 (e.g., personal computer), tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking service 730. The UI element selection manager 721 may be employed by a client that communicates with server device 702, and/or the UI element selection manager 720 may be employed by server device 702. The server device 702 may provide data to and from a client computing device such as a general computing device 704, a tablet computing device 706 and/or a mobile computing device 708 (e.g., a smart phone) through a network 715. By way of example, the computer system described above with respect to FIGS. 1-6 may be embodied in a general computing device 704 (e.g., personal computer), a tablet computing device 706 and/or a mobile computing device 708 (e.g., a smart phone). Any of these embodiments of the computing devices may obtain content from the store 716, in addition to receiving graphical data useable to either be pre-processed at a graphic-originating system or post-processed at a receiving computing system.

As should be appreciated, FIG. 7 is described for purposes of illustrating the present methods and systems and is not intended to limit the disclosure to a particular sequence of steps or a particular combination of hardware or software components.

Figure 8:
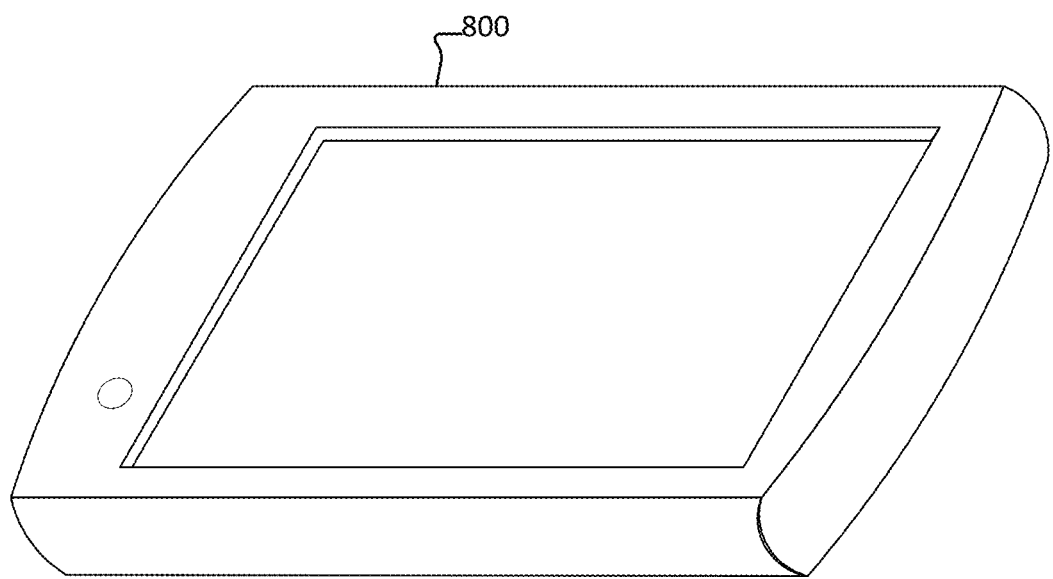
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 8 is described for purposes of illustrating the present methods and systems and is not intended to limit the disclosure to a particular sequence of steps or a particular combination of hardware or software components.

The embodiments of the disclosure described herein are implemented as logical steps in one or more computer systems. The logical operations of the present disclosure are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosure. Accordingly, the logical operations making up the embodiments of the disclosure described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the disclosure. Since many embodiments of the disclosure can be made without departing from the spirit and scope of the disclosure, the disclosure resides in the claims hereinafter appended. Furthermore, structural features of the different embodiments may be combined in yet another embodiment without departing from the recited claims.

What is claimed is:

1. A system comprising:
   a processor; and
   memory coupled to the processor, the memory comprising computer executable instructions that, when executed by the processor, performs a method comprising:
      receiving, within a user interface, a first series of gaze inputs associated with at least a first selection zone of a first UI element, wherein the first selection zone of the first UI element is assigned a first score;
      assigning the first score to one or more gaze inputs in the first series of gaze inputs;
      aggregating each first score assigned to the one or more gaze inputs in the first series of gaze inputs to calculate a first UI element score for the first UI element;
      based on the first UI element score, performing an action response associated with the first UI element;
      in response to the action response, using a predictive analysis algorithm to dynamically assign a second score to a first selection zone of a second UI element within the user interface, wherein dynamically assigning the second score to the first selection zone comprises:
         identifying a previous or default score for the first selection zone of the second UI element; and
         in response to determining, by the predictive analysis algorithm, that a second series of gaze inputs is likely to be directed toward the second UI element following the action response, increasing the previous or default score to the second score;
      receiving, within the user interface, the second series of gaze inputs directed toward the first selection zone of the second UI element;
      assigning the second score to one or more gaze inputs in the second series of gaze inputs; and
      aggregating each second score assigned to the one or more gaze inputs in the second series of gaze inputs to calculate a second UI element score for the second UI element.

2. The system of claim 1, wherein:
   the first selection zone of the first UI element surrounds a boundary of the first UI element; and
   a second selection zone of the first UI element surrounds the first selection zone of the first UI element.

3. The system of claim 2, wherein:
   the first series of gaze inputs is further associated with the second selection zone of the first UI element;
   the second selection zone of the first UI element is assigned a third score; and
   calculating the first UI element score comprises aggregating the one or more gaze inputs having the first score with one or more gaze inputs having the third score.

4. The system of claim 1, wherein:
   the first selection zone of the first UI element surrounds a center point of the first UI element, the first selection zone comprising less than all of the first UI element; and
   a second selection zone of the first UI element encircles the first selection zone of the first UI element.

5. The system of claim 1, wherein performing the action response associated with the first UI element comprises:
   comparing the first UI element score to a first threshold for the first UI element; and
   when the first UI element score exceeds the first threshold, activating the first UI element.

6. The system of claim 1, wherein the predictive analysis algorithm is based on at least one of contextual information or historical eye-gaze typing patterns.

7. The system of claim 6, wherein the contextual information comprises at least one of:
   a type of application in use;
   previous message context in a conversation;
   substantive content in a document;
   GPS location of a user; or
   an intended recipient of a message.

8. The system of claim 6, wherein the historical eye-gaze typing patterns comprise at least one of:
   user data related to a document; or
   data associated with past user actions related to the document.

9. The system of claim 1, wherein using the predictive analysis algorithm to dynamically assign the second score to the first selection zone of the second UI element comprises:

determining the second UI element is a critical key having a function beyond character entry.

10. The system of claim 9, wherein the critical key is associated with a second activation threshold that is lower than a first activation threshold for the second UI element.

11. A method comprising:
receiving, within a user interface, a first series of gaze inputs associated with at least a first selection zone of a first UI element, wherein the first selection zone of the first UI element is assigned a first score;
assigning the first score to one or more gaze inputs in the first series of gaze inputs;
aggregating each first score assigned to the one or more gaze inputs in the first series of gaze inputs to calculate a first UI element score for the first UI element;
when the first UI element score exceeds a first threshold value for activating the first UI element, performing an action response associated with the first UI element;
in response to the action response, using a predictive analysis algorithm to dynamically assign a second score to a first selection zone of a second UI element within the user interface, wherein dynamically assigning the second score to the first selection zone comprises:
identifying a previous or default score for the first selection zone of the second UI element; and
in response to determining, by the predictive analysis algorithm, that a second series of gaze inputs is likely to be directed toward the second UI element following the action response, increasing the previous or default score to the second score;
receiving, within the user interface, the second series of gaze inputs directed toward the first selection zone of the second UI element;
assigning the second score to one or more gaze inputs in the second series of gaze inputs; and
aggregating each second score assigned to the one or more gaze inputs in the second series of gaze inputs to calculate a second UI element score for the second UI element.

12. The method of claim 11, further comprising:
when the second UI element score exceeds a second threshold value for activating the second UI element, activating the second UI element.

13. The method of claim 12, wherein the second threshold value is lower than the first threshold value.

14. The method of claim 12, wherein, in response to the action response, the second threshold value is decreased from a default threshold value for the second UI element.

15. The method of claim 11, wherein the predictive analysis algorithm uses a semantic determination mechanism to determine an intended meaning of user action associated with the first series of gaze inputs.

16. A system comprising:
a processor; and
memory coupled to the processor, the memory comprising computer executable instructions that, when executed by the processor, performs a method comprising:
receiving, within a user interface, a first series of gaze inputs associated with at least a first selection zone of a first UI element, wherein the first selection zone of the first UI element is assigned a first score;
assigning the first score to one or more gaze inputs in the first series of gaze inputs;
aggregating each first score assigned to the one or more gaze inputs in the first series of gaze inputs to calculate a first UI element score for the first UI element;
based on the first UI element score, performing an action response associated with the first UI element;
in response to the action response, using a predictive analysis algorithm to dynamically change a first selection zone of a second UI element within the user interface to a first size, wherein dynamically changing the first selection zone of the second UI element to the first size comprises:
identifying a previous or default score for the first selection zone of the second UI element;
in response to determining, by the predictive analysis algorithm, that a second series of gaze inputs is likely to be directed toward the second UI element following the action response, changing the previous or default score to a second score; and
changing the first selection zone of the second UI element to the first size based on the second score;
receiving, within the user interface, the second series of gaze inputs directed toward the first selection zone of the second UI element;
assigning the second score to one or more gaze inputs in the second series of gaze inputs; and
aggregating each second score assigned to the one or more gaze inputs in the second series of gaze inputs to calculate a second UI element score for the second UI element.

17. The system of claim 16, wherein determining whether the second UI element is likely to follow the first UI element as a selection comprises identifying a letter or a word previously entered into the user interface.

18. The system of claim 16, wherein performing the action response associated with the first UI element comprises:
providing a visual cue indicating a selection of the first UI element; and
activating the first UI element.

19. The system of claim 1, wherein increasing the previous or default score for the first selection zone of the second UI element to the second score does not change a size of the first selection zone of the second UI element.

20. The method of claim 11, wherein a size of the first selection zone of the second UI element remains constant when the predictive analysis algorithm dynamically assigns the second score to the first selection zone of the second UI element.

* * * * *